UNITED STATES PATENT OFFICE.

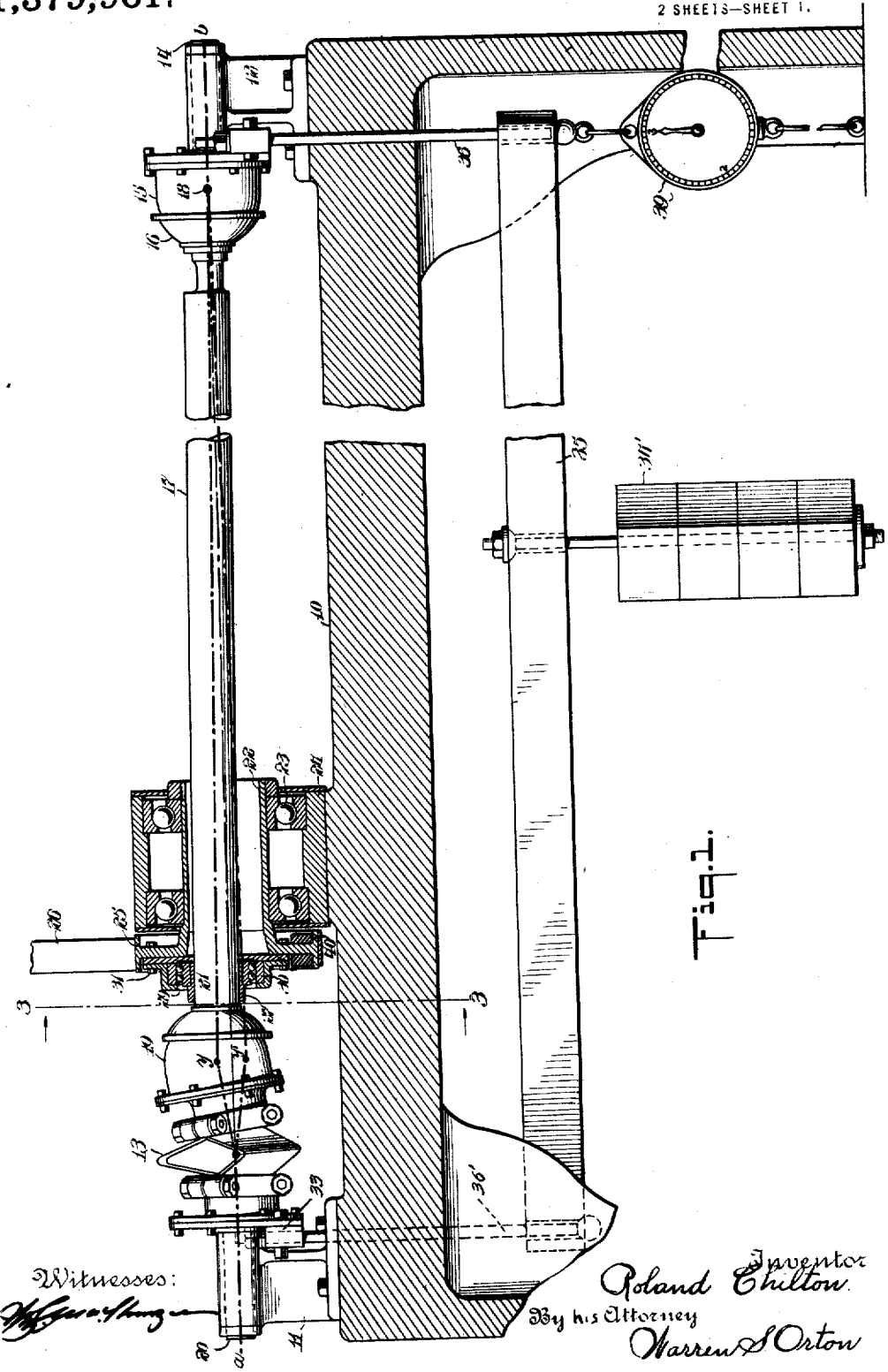

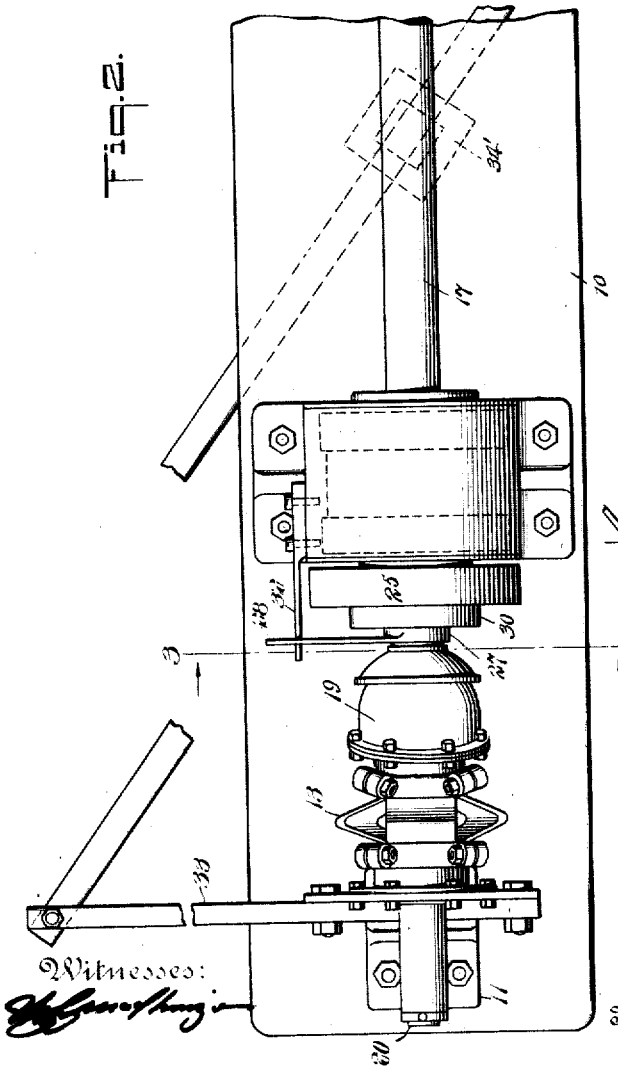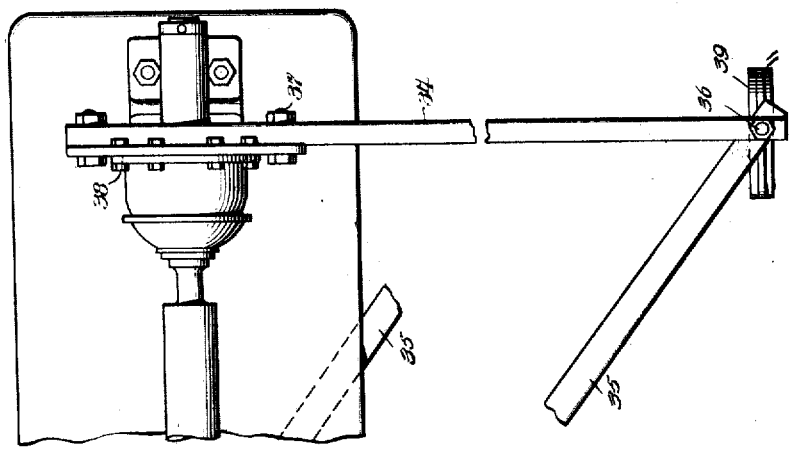

ROLAND CHILTON, OF FREEHOLD, NEW JERSEY.

METHOD AND APPARATUS FOR TESTING UNIVERSAL JOINTS.

1,379,961.  Specification of Letters Patent.  Patented May 31, 1921.

Application filed November 15, 1919. Serial No. 338,309.

*To all whom it may concern:*

Be it known that I, ROLAND CHILTON, a subject of the King of Great Britain, and resident of Freehold, in the county of Monmouth and State of New Jersey, have invented certain new and useful Improvements in Methods and Apparatus for Testing Universal Joints, of which the following is a specification.

The invention relates to a method for testing and comparing universal joints and similar articulated power transmission members incidental to the obtaining of physical data relative to such members and the invention also relates to a testing machine for conveniently practising the method.

The primary object of the invention is to provide an improved method for accurately and economically determining the transmission efficiency, the frictional losses, and similar physical facts, of a universal joint.

The primary object when considering the mechanical phase of the invention is to provide a simple form of machine in which the torque, angular deflection, speed, and duration of test may be carried up to the ultimate capacity of the joint acted upon, and at the same time to minimize power waste heretofore involved in known forms of such testing machines.

The movement obtaining in a universal joint connecting two shafts with intersecting axes results from the relative rotation between these shafts and the common plane of their axes. In operation the common plane of the axes is usually stationary while the shafts rotate and it is under these conditions that the joint is usually tested. Tests under these conditions, however, are unsatisfactory due to inaccuracy in the data obtained and in the expense involved in supplying the power necessary to make the test. In testing machines of the Prony-brake or dynamometer type, for instance, the rotation of the shafts necessitates the use of a horse-power equal to the horse-power under which the joints are tested plus the incidental loss in friction. This invention, therefore, contemplates a method of testing universal joints in which the joint is held from rotating, and flexed while so held. The only horse-power used is that necessary to compensate for the frictional losses in the flexing of the joint under test.
Broadly, I obtain this object by providing a torque transmitting organization of parts including three universal joints in which each of the end joint elements are held by a torque force against relative movement about their axes and in which a force is imposed on an offset end of the intermediate joint element to rotate the common plane of intersection of the axes over a planetary path about the common axes of the end joint elements at a regulated speed.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings;—

Figure 1 is a longitudinal vertical sectional view taken through a preferred physical embodiment of the machine feature of the invention and showing one instrumentality by means of which the method may be conveniently practised and with parts thereof broken away to minimize space;

Fig. 2 is a plan view looking down upon the device shown in Fig. 1; and

Fig. 3 is a transverse sectional view taken on the lines 3—3 of Figs. 1 and 2.

In the drawings, there is shown a stable support 10 in the form of a work-table upon which are mounted at opposite ends, a pair of upstanding journal blocks 11 and 12. Suspended between the blocks is a shafting unit constituting an organization of power transmitting elements including three universal joint elements, one of which 13 at the left of the testing machine is the joint to be tested. This organization includes, in order, from right to left of the showing in the drawing, a shaft 14 mounted for free rotary movement in the bearing block 12, to the inner end of which shaft is fastened one element 15, of the right-hand universal joint. The other element 16 of this joint constitutes one end of a relatively long shaft 17 mounted for universal articulation relative to the shaft 14 and free to swing about a point of reference in the axis of the shaft 17 indicated at 18 in Fig. 1. The opposite or floating end of the shaft 17 is connected to the universal joint 13, which forms the left hand joint of the series, through an intermediate universal joint 19 similar in construction but oppositely disposed in the right hand joint hereinbefore described.

The outer side of the joint 13 is connected to the inner end of a shaft 20 rotatably mounted in the bearing block 11. The shafts 14 and 20 each possess a freedom of rotary movement about a common axis of rotation indicated by the line $a$—$b$. The free end 21 of the shaft 17, adjacent its connection with the intermediate joint 19, is given a planetary motion about the axis $a$—$b$. For this purpose the floating end of the shaft is acted upon by an eccentric driving mechanism. This mechanism includes a sleeve 22 rotatably mounted in anti-friction bearings 23 contained in a bearing block 24 carried by the support 10. The sleeve projects from one end from the block 24 and is enlarged to provide a driven pulley wheel 25. The pulley wheel is engaged by a power driven belt 26, by means of which rotary power is applied to cause the planetary motion of the intermediate joint at any desired speed. The shaft 17 extends through the bore of the sleeve 22 which is of sufficient diameter to contain the shaft in its several shifted positions. To the outside of the pulley 25 the shaft is freely engaged by the hub 27 of a laterally extending torque arm 28 more particularly shown in Fig. 3. The hub 27 supports an anti-friction bearing 29 mounted within a self-alining housing 30 fastened by means of bolts 31 to the outer face of the pulley 25. The housing is eccentrically mounted relative to the pulley, so that when the pulley with the sleeve 22 is rotated about the axis $a$—$b$ the center of articulation of the joint 19 moves in a circular path in a plane perpendicular to the axis $a$—$b$ from a high position back of the point $y$ in Fig. 1 through a low position back of the point $y'$ in this figure.

Any tendency of the rotating bearing to impose by its frictional resistance a reactory movement on the sleeve 22 is resisted by the engagement of the torque arm 28 with a stop finger 32 fixed to the bearing block 24.

When it is desired to test only the endurance of a universal joint transmitting power between two angular disposed shafts it is suggested that one of the shafts 14 or 20 may be fixed against rotation by any suitable means and that a torque arm 33 or 34 be secured to the other shaft, which is free to rotate in its bearing block.

When it is desired to determine in addition the mechanical efficiency of a universal joint the construction shown in the drawings may be used wherein: The end shafts 14 and 20 are free to rotate in their respective bearings and have equal and opposite torque forces imposed thereon, by a variable weight 34' hung from the center of an equalizing beam 35 opposite ends of which are hung from the outer end of the torque arms 33 and 34 through depending hanging links 36. The torque arms are fastened by means of bolts 37 to flanged heads 38 defining the inner ends of the shafts 14 and 20 and extend laterally therefrom in opposite directions, as shown in Fig. 2. The tendency of the system to rotate about the axis $a$—$b$ is measured by a spring balance 39 secured to one end of the equalizing beam, as shown in Fig. 1. It will be seen that the frictional losses at the three joints will be indicated on the spring balance which is suitably calibrated to give readings in any desired system of units.

For the purpose of enabling the device to be run at very high speed, without undue vibration, the centrifugal effect of the intermediate joint 19 is counter-balanced by a weight 40 suitably fixed to the pulley 25 and oppositely disposed to the eccentric bearing 29.

In operation, and with the parts in position shown in the figures, the driven pulley 25 actuates the eccentric mechanism at a definite and known speed while a definite and known torque is imposed on the system by the weights 34 and associated torque arms as described. The tendency of the system to rotate, that is, the frictional resistance of the universal joints at the particular torque and speed conditions is recorded by the spring balance 30. The ratio of this force to the force exerted by the main torque weights 34, is the mechanical efficiency of the joints according to the well known principles of mechanics. In this way the joint 13 to be tested is given the angular deflection to which it would be subjected in actual practice when transmitting power through the rotation of the system of which the joint is a part.

It is understood that the position of the eccentric mounting of the bearing 29 may be varied to or from the axis $a$—$b$ and in this way the angle through which the joint 13 is deflected is changed to meet the requirements of different joints under test.

As the joint 19 travels through one orbit, that is to say, one revolution of the driving sleeve, the two elements of the joint are maintained at a constant angular relation and are subjected to the same relative movement, as will obtain when the joints are used to connect two rotary shafts disposed in this same angular relation. By a suitable control of the power belt and adjustment of the torque weights 34 the speed of the planetary vibration and the torque to which the joints are subjected may be adjusted to equal any desired horsepower transmitted through the organization if it were rotating. By substituting a tested joint having known physical characteristics in place of the joint 13 under test, a comparison between the two joints can be readily made and data obtained with reference to some accepted standards.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In the art of testing the efficiency of an organization consisting of two shafts connected by a universal joint, the method which consists in imposing a torque force on the organization in a direction tending to prevent relative rotary movement of the shafts about their axes and causing one end of the joint to describe a planetary movement thereby to cause the common plane of the axes of the shafts to rotate.

2. In the art of testing the efficiency of an organization consisting of two shafts connected by a universal joint, the method which consists in imposing a torque force on the organization in a direction tending to prevent relative rotary movement of the shafts about their axes and causing one end of the joint to describe a planetary movement thereby to cause the common plane of the axes of the shafts to rotate, and measuring said torque force.

3. In the art of testing the efficiency of an organization consisting of two shafts connected by a universal joint, the method which consists in imposing a torque force on the organization in a direction tending to prevent relative rotary movement of the shafts about their axes and imposing a turning moment (of known value) to one end of the joint to cause the same to describe a planetary movement thereby to cause the common plane of the axes of the shafts to rotate and measuring the torque force necessary to prevent relative movement of the system under the influence of said turning moment, and measuring the reaction from such turning moment.

4. In a device of the class described, the combination of two universal joint elements, one of which is provided with means for connecting the same with a third joint and coacting therewith to form a torque transmitting series, with the joint elements disposed in longitudinal order, means for mounting the end elements in axial alinement, means for imposing a turning moment on said series thereby to hold the end elements fixed relative to each other, and power means acting on one end of an intermediate joint element to cause the same to describe a planetary motion about the axis of said end elements while the other end of the joint is held from rotation by said turning moment.

5. In a device of the class described, the combination of two universal joint elements, one of which is provided with means for connecting the same with a third joint and coacting therewith to form a torque transmitting series, with the joint elements disposed in longitudinal order, means for mounting the end elements in axial alinement, means for imposing a potential turning moment on one of said end elements to resist any tendency of the series to rotate and means for causing the intermediate joint element to describe a planetary motion about the axis of said end elements.

6. In a device of the class described, the combination of two universal joint elements, one of which is provided with means for connecting the same with a third joint and coacting therewith to form a torque transmitting series, with the elements disposed in longitudinal order and one of which elements is a universal joint, means for mounting the end elements of the series in axial alinement, means for imposing a turning moment on the series to resist the tendency of the same to rotate, means for causing a part of the universal joint to describe a planetary motion about the axis of said end elements and means for measuring the torque moment necessary to resist the tendency of said planetary motion to cause rotation of the series.

7. In a device of the class described, the combination of an organization including two universal joint elements disposed in longitudinal order and adapted to have a third element to be tested operatively connected therewith, means for securing the end elements in longitudinal alinement, said end elements having a freedom of relative movement about a common axis of rotation, means engaging one of the joint elements to move the same about said axis and means for imposing a torque load on the organization thereby to measure the power transmission losses in the joint elements.

8. In a device of the class described, the combination of an organization including a plurality of universal joint elements provided with means for securing another joint element to the organization and all of said elements disposed substantially in longitudinal alinement, means for mounting one of the elements to have a limited freedom of movement about a fixed axis of rotation, means for imposing a torque force on said element, and means for causing the next adjacent joint element to describe a planetary movement about the common plane of the axis of said elements.

9. In a device of the class described, the combination of two universal joint elements provided with means for connecting the same with a third joint element and coacting therewith to form an organization with the universal joint elements disposed substantially in longitudinal alinement, means for mounting the end elements to have a limited freedom of relative movement about a common axis of rotation, means for imposing a torque force to oppose said relative movement and means for causing the intermediate joint element to describe a planetary movement about the common plane of the axis of said joint elements.

10. In a device of the class described, the combination of means adapted to coact with a member to be tested to form a torque transmitting member including a universal joint, means engaging oppositely disposed portions of said member to hold the same fixed relative to a common axis, eccentrically actuated means engaging said member intermediate said oppositely disposed portions for causing a part of the joint to describe a circular movement in a plane perpendicular to said common axis and means for measuring the torque force acting on said member, tending to rotate the said oppositely disposed portions.

11. In a device of the class described, the combination of means adapted to coact with a member to be tested to form a torque transmitting member including a universal joint, means engaging oppositely disposed portions of said member to hold the same fixed relative to a common axis, eccentrically actuated means engaging said member intermediate said oppositely disposed portions for causing a part of the joint to describe a circular movement in a plane perpendicular to said common axis, means acting on said eccentrically actuated means compensating for the tendency of the same to rotate and means for measuring the torque force acting on said member, tending to rotate the said oppositely disposed portions.

12. In a device of the class described, the combination of means adapted to coact with a member to be tested to form a torque transmitting member including a universal joint, means engaging oppositely disposed portions of said member to hold the same fixed relative to a common axis while permitting rotary movement about said axis, a driven pulley encircling said member and mounted for free rotary movement about said axis, an eccentric mounting for said member engaging the same at one side of the universal joint, and operatively connected to the pulley to actuate the same and thus cause one side of the joint to describe a planetary movement about the said common axis.

13. In a device of the class described, the combination of means adapted to coact with a member to be tested to form a torque transmitting member including a universal joint, means engaging oppositely disposed portions of said member to hold the same fixed relative to a common axis while permitting rotary movement about said axis, a driven pulley encircling said member and mounted for free rotary movement about said axis, an eccentric mounting for said member engaging the same at one side of the universal joint, and operatively connected to the pulley to actuate the same and thus cause one side of the joint to describe a planetary movement about the said common axis and a torque member carried by the eccentric mounting and resisting the tendency of the mounting to rotate the member.

14. In a device of the class described, the combination of means adapted to coact with a member to be tested to form a torque transmitting member including a universal joint, means engaging oppositely disposed portions of said member to hold the same fixed relative to a common axis while permitting rotary movement about said axis, a driven pulley encircling said member and mounted for free rotary movement about said axis, an eccentric mounting for said member engaging the same to one side of the universal joint, and operatively connected to the pulley to actuate the same and thus cause one side of the joint to describe a planetary movement about the said common axis, a torque member carried by the eccentric mounting and resisting the tendency of the mounting to rotate the pulley and another torque member operatively connected to one of said oppositely disposed portions and tending to prevent rotary movement of said torque transmitting member.

15. In a device of the class described, the combination of a joint, an eccentric mechanism for flexing one side of said joint, said mechanism including a member mounted for rotary movement and means reacting on said rotary movement for minimizing the tendency of the centrifugal effect of the joint to set up vibration.

16. In the art of testing the mechanical efficiency, durability and power transmitting capacity of an organization for drivably connecting two angularly disposed shafts for unitary rotation; the method which consists in applying opposed and balanced torque loads of known magnitude to the opposed elements of the organization, while maintained at a known angular relation, causing the common plane of the said elements to rotate, and restraining said elements from rotating about their own axes by means adapted to measure their tendency to so rotate.

Signed at Keyport, in the county of Monmouth and State of New Jersey, this twenty-fourth day of October, A. D. 1919.

ROLAND CHILTON.